US011670935B2

United States Patent
Russell et al.

(10) Patent No.: US 11,670,935 B2
(45) Date of Patent: Jun. 6, 2023

(54) ELECTRONIC PROTECTION CIRCUIT WITH INSTABILITY PREVENTION

(71) Applicant: SiliconBrite Technologies, Inc., Santa Clara, CA (US)

(72) Inventors: Anthony Gerard Russell, San Jose, CA (US); Baris Karagozlu, Dublin, CA (US)

(73) Assignee: SiliconBrite Technologies, Inc., Santa Clara, CA (US)

( * ) Notice: Subject to any disclaimer, the term of this patent is extended or adjusted under 35 U.S.C. 154(b) by 0 days.

(21) Appl. No.: 17/519,475

(22) Filed: Nov. 4, 2021

(65) Prior Publication Data

US 2022/0320850 A1 Oct. 6, 2022

Related U.S. Application Data

(60) Provisional application No. 63/231,886, filed on Aug. 11, 2021, provisional application No. 63/167,653, filed on Mar. 30, 2021.

(51) Int. Cl.
*H02H 3/20* (2006.01)
*H02H 1/00* (2006.01)

(52) U.S. Cl.
CPC .......... *H02H 3/207* (2013.01); *H02H 1/0007* (2013.01)

(58) Field of Classification Search
CPC ........ H02H 3/20; H02H 3/207; H02H 1/0007; H02M 1/32; H03K 17/0822
See application file for complete search history.

(56) References Cited

U.S. PATENT DOCUMENTS

2021/0351583 A1\* 11/2021 Shigeta ................ H02H 1/0007

FOREIGN PATENT DOCUMENTS

EP 3944438 A1 \* 1/2022

\* cited by examiner

*Primary Examiner* — Pinping Sun
*Assistant Examiner* — Nicolas Bellido
(74) *Attorney, Agent, or Firm* — André Grouwstra; Grouwstra IC & Software Patent

(57) ABSTRACT

A protection IC protects an external load connected to mains supply lines from dangerous or undesired conditions such as overvoltage, undervoltage, and overcurrent, by disconnecting the external load for at least the duration of such a condition. The IC has a range detector, a zero-crossing detector, a control unit, a switch driver, and a dummy DAC. The range detector senses the presence of an unwanted condition. The control unit then waits for a zero crossing, upon which it disconnects the load. A lockout timer may introduce a minimum wait time before reconnecting the load. To prevent instabilities around the switching points, hysteresis in the window thresholds prevents impact from noise. The dummy DAC regulates a dummy current that linearizes the IC's current consumption around the switching points to prevent instabilities caused by positive feedback in non-linear transitions.

12 Claims, 5 Drawing Sheets

ELECTRONIC PROTECTION CIRCUIT WITH INSTABILITY PREVENTION

CROSS REFERENCES TO RELATED APPLICATIONS

This application claims priority from U.S. provisional patent application Ser. No. 63/167,653, entitled Electronic Fuse System and Method, filed on Mar. 30, 2021, which is hereby incorporated by reference as if set forth in full in this application for all purposes.

This application claims priority from U.S. provisional patent application Ser. No. 63,231,886, entitled High-Reliability Low-Loss Power Switch and Driver IC, filed on Aug. 11, 2021, which is hereby incorporated by reference as if set forth in full in this application for all purposes.

BACKGROUND

Technical Field

The disclosed implementations relate generally to systems and methods used in power management, and in particular to those for overvoltage protection systems and electronic protection systems. Implementations may be implemented as integrated circuits or otherwise. Implementations may be used for protection against overvoltage events and undervoltage events, but may also be used for sensing and precision monitoring.

Context

Unpredictable fluctuations in power supplied by alternating-current (AC) mains lines cause damage to electronic and electric equipment, which results in economic loss and worse. They may also cause interference, resulting in incorrect or unsafe operation of sensitive equipment.

One effect of an overvoltage is that electronic devices heat up, and as a result suffer heat damage. For example, an electrolytic capacitor may heat up only a little bit from a very short spike in voltage, but if it is sustained, the capacitor will burn out. This can cause a short-circuit or on open circuit, and in turn it can result in the end of an electronic system's operation. Semiconductors can get damaged from overvoltage even quicker. Undervoltage also causes problems, particularly with the reliability of a system's operation.

Conventionally, the problem of supply fluctuations has been dealt with by discrete solutions including varistors and capacitors. Whereas such solutions are often low-cost, they have a limited lifespan as they can only handle a fixed number of voltage spikes. Therefore, they may give a false sense of protection upon failure of one of the protecting devices.

Another issue is that, due to naturally occurring noise, an electronic protection system can become unstable around the overvoltage and undervoltage thresholds. To combat this, these thresholds are designed with a hysteresis. However an electronic protection system that is powered from a high voltage source via a resistor may still suffer from instability around the time of switching. This instability is not resolved by the applied hysteresis alone.

Some conventional electronic protection systems switch fast, but they suffer from large voltage spikes when interrupting the supplies.

Clearly, there is an unmet need for solid-state solutions (i.e., implemented as an integrated circuit) with a low cost and a small footprint. But those solutions also need to be able to handle voltage spikes indefinitely and autonomously, very fast, without causing spikes and other unwanted behavior, and without instabilities.

Unless otherwise indicated herein, elements described in this section are not prior art to the claims and are not admitted being prior art by inclusion in this section.

SUMMARY

The disclosed technology recognizes that in an electronic protection circuit not all instabilities are caused by natural noise occurring on the mains voltage, but some may be caused by positive feedback problems due to operational nonlinearities. An electronic protection system protects an external load from, for example, overvoltage, undervoltage, and/or overcurrent conditions a mains supply lines, by disconnecting the load from the mains supply lines when the dangerous conditions occur. A requirement to perform highly efficiently leaves a tiny energy budget for an electronic protection system. The energy flowing in and out of an integrated circuit (IC) at its sense and switch driver terminals may be significant relative to the power used internally. Activating the fuse takes extra power, both for internal operation and for devices connected to its pins, as a result of which the IC's internal supply levels may change, impacting reference voltages used for the thresholds. An impact can be negative, creating an inherently stable feedback loop, or positive, creating an inherently instable feedback loop. Implementations use one or more variable dummy currents and/or external filters associated with currents flowing in and out of pins to reduce or invert supply current discontinuities during threshold crossings. A dummy current may be generated with a DAC, a dummy resistor, or with a dummy current source. A DAC with current source output may be controlled by the supply voltage level. The reduced or inverted power swings reduce or cancel the positive feedback during threshold crossings, turning implementations stable.

In a first aspect, an implementation provides an electronic protection circuit. The circuit may be an IC. The circuit has a supply terminal, a common terminal, a sense terminal, one or more zero-crossing detection input terminals, and a switch driver output terminal. Coupled between the supply terminal and the common terminal is a dummy DAC, that may be controlled by a control unit. A zero-crossing detector is coupled between the one or more zero-crossing detection input terminals and the control unit. The zero-crossing detector is operable to determine times of zero crossings in a signal applied to the one or more zero-crossing detection input terminals, and to signal those times to the control unit. An in-range detector is coupled between the sense terminal and the control unit. It is operative to determine whether a peak value of an external raw supply voltage is inside or outside an allowed range. The allowed range may be widened or narrowed. The in-range detector delivers a range-detection output signal that signals an in-range condition and an out-of-range condition associated with whether the peak value of the external raw supply voltage is inside or outside of the allowed range. Between the in-range detector and the control unit may be a lockout timer with a configurable lockout duration. The lockout timer ensures that the control unit does not receive an in-range signal from the in-range detector unless at least the lockout duration has passed since the start or end of an out-of-range signal. This allows the external load some thermal recovery time after the electronic protection circuit has disconnected the load from the mains supply lines following detection of a dangerous condition. The dummy DAC has a current output. It supplies a dummy current that prevents instability resulting from positive feedback during changes in operation of the IC, wherein the dummy current runs from the supply terminal through the dummy DAC to the common terminal.

In a second aspect, an implementation provides a method for protecting the load from overvoltage or undervoltage conditions in the raw supply voltage. The method starts with decoupling the load from the raw supply voltage, and initializing the dummy current to a first value in the protection IC. The IC then senses the raw supply voltage, and determines if its peak value is in a narrowed allowed range. If so, it widens the allowed range to become the widened allowed range. It waits for a first zero crossing, which may be a zero crossing of the raw supply voltage, or of a voltage measured over the switch. It then changes the dummy current to a second value, and couples the load with the raw supply voltage. The method proceeds with determining if the raw supply peak value is outside the widened allowed range. If so, it narrows the allowed range again, then waits for a second zero crossing, changes the dummy current to a third value, and decouples the load from the raw supply voltage.

A further understanding of the nature and the advantages of particular implementations disclosed herein may be realized by reference of the remaining portions of the specification and the attached drawings.

BRIEF DESCRIPTION OF THE DRAWINGS

The disclosed technology will be described with reference to the drawings, in which.

Figure 1:
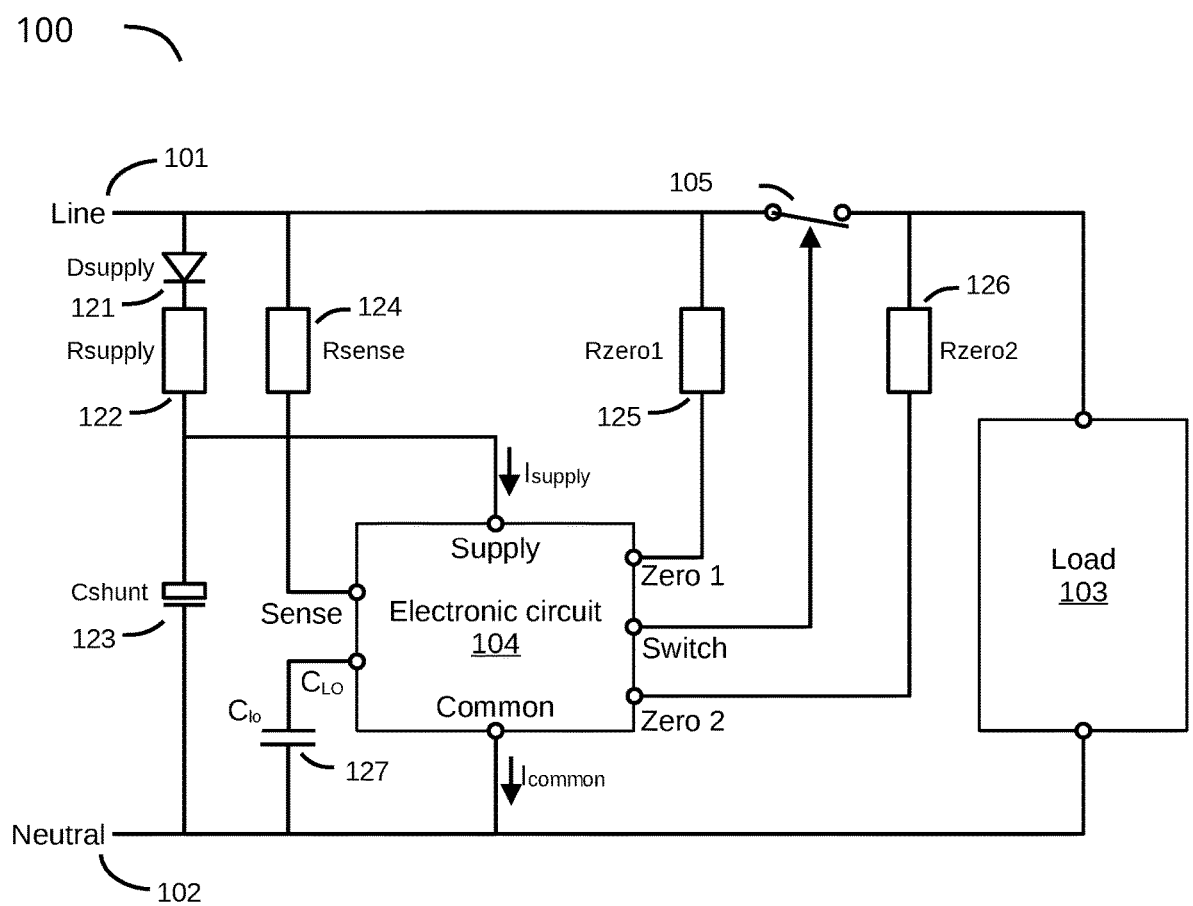
FIG. 1 shows a low-cost electronic protection system in an implementation of the disclosed technology.

In the figures, like reference numbers may indicate functionally similar elements. The systems and methods illustrated in the figures, and described in the Detailed Description below, may be arranged and designed in a wide variety of different implementations. Neither the figures, nor the Detailed Description, are intended to limit the scope as claimed. Instead, they merely represent examples of different implementations of the disclosed technology.

DETAILED DESCRIPTION

Terminology

The term "coupled" is used in an operational sense and is not limited to a direct or an indirect coupling. "Coupled to" is generally used in the sense of directly coupled, whereas "coupled with" is generally used in the sense of directly or indirectly coupled. "Coupled" in an electronic system may refer to a configuration that allows a flow of information, signals, data, or physical quantities such as electrons between two elements coupled to or coupled with each other. In some cases the flow may be unidirectional, in other cases the flow may be bidirectional or multidirectional. Coupling may be galvanic (in this context meaning that a direct electrical connection exists), capacitive, inductive, electromagnetic, optical, or through any other process allowed by physics.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A "computer" may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used herein, the term "and/or" should be interpreted to mean one or more items. For example, the phrase "A, B, and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B, and C" or the phrase "at least one of A, B, or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B, and C" or the phrase "one or more of A, B, or C" should be interpreted to mean any of: only A, only B, only C, A and B (but not C), B and C (but not A), A and C (but not B), or all of A, B, and C.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

AC—alternating current—an electric current that reverses its direction regularly or irregularly.

DC—direct current—an electric current that flows in only one direction.

DAC—digital-to-analog converter

DMOS—double-diffused MOSFET

IC—integrated circuit—this may be a monolithically integrated circuit, i.e., a single semiconductor die that includes a circuit, or it may be a multichip module that includes multiple semiconductor dies in a single package and that may further include a substrate onto which the dies are mounted, and further electronic devices.

IGBT—insulated gate bipolar transistor

Lockout duration—a time span during which the electronic protection system does not reconnect a load to a raw mains supply, to allow the load to recover, for example by cooling off, after the electronic protection system has disconnected the load.

MOSFET—metal-oxide-semiconductor field-effect transistor.

Implementations

FIG. 1 shows a low-cost electronic protection system 100 in an implementation of the disclosed technology. Mains power supply lines line rail 101 and neutral rail 102 provide an external raw supply voltage for load 103. To protect load 103 from excessive changes in the external raw supply voltage, electronic protection circuit 104 may decouple load 103 from line rail 101 using power switch 105. The external raw supply voltage may for instance be a 110V, 60 Hz AC supply voltage as is common in the US, a 230V, 50 Hz AC supply voltage as is common in Europe, or any other AC voltage. An implementation may provide protection against overvoltage, undervoltage, overcurrent, or any combination of these. Load 103 may be or include any part of an electronic system that normally uses a mains supply or any other external raw supply voltage. For example, load 103 may include a rectifier bridge that rectifies the mains supply voltage to derive a DC or direct current supply voltage. Electronic protection circuit 104 may be implemented in any form, including as a monolithic integrated circuit (a single-die IC), as a multichip module (MCM) that includes multiple dies placed on a substrate and packaged as a single device, as a printed circuit board (PCB) with monolithic and discrete devices, etc. An implementation may have power switch 105 external to electronic protection circuit 104, or internal to it. Some implementations use a single power switch 105, other implementations may use multiple power switches, and/or switch neutral rail 102 instead of or in addition to line rail 101. Power switch 105 may be, or include, any suitable electronic switch, including but not limited to an IGBT, bipolar transistor, MOSFET, super-junction MOSFET, DMOS transistor, thyristor, etc.

In general, electronic protection circuit 104 operates at a much lower circuit supply voltage than the external raw supply voltage between line rail 101 and neutral rail 102. This lower circuit supply voltage may be derived from the external raw supply voltage at a very low cost, for example as shown, using diode Dsupply 121, resistor Rsupply 122, and capacitor Cshunt 123. However, this combination may act as a current source rather than as a voltage source, delivering a current Isupply whose size is directly dependent on the external raw supply voltage. The current Isupply is also dependent on the internal operation of electronic protection circuit 104, and any changes in its internal operation may result in a change in the resulting supply voltage received by electronic protection circuit 104, which may impact threshold detection, and create instability. Implementations prevent instability as described in this document. Resistor Rsupply 122 typically has a high value, so that current Isupply is very small and electronic protection system 100 can operate at a high efficiency.

To sense an occurrence of overvoltage (the positive peak amplitude or the negative peak amplitude of the external raw supply voltage is too high), and/or to sense an occurrence of undervoltage (the positive peak amplitude or the negative peak amplitude of the external raw supply voltage is too low), electronic protection circuit 104 senses the external raw supply voltage via resistor Rsense 124. This resistor typically has a high value, so that only a little current enters electronic protection circuit 104 at its Sense terminal.

To prevent glitches due to power switch 105 interrupting or reconnecting the current to load 103, an implementation switches when only a small or no current is flowing. Such a situation is expected to occur at twice the mains frequency, for example 100 or 120 times per second. FIG. 1 depicts one way of detecting such a "zero crossing", in this case by sensing the instantaneous voltage at both sides of power switch 105, using resistors Rzero1 125 and Rzero2 126. Switching is safe when there is no voltage differential. Implementations other than the one depicted in FIG. 1 may sense zero crossings at other places, for instance as shown later with reference to FIG. 5, or may use a single zero crossing sense input.

Figure 2A:
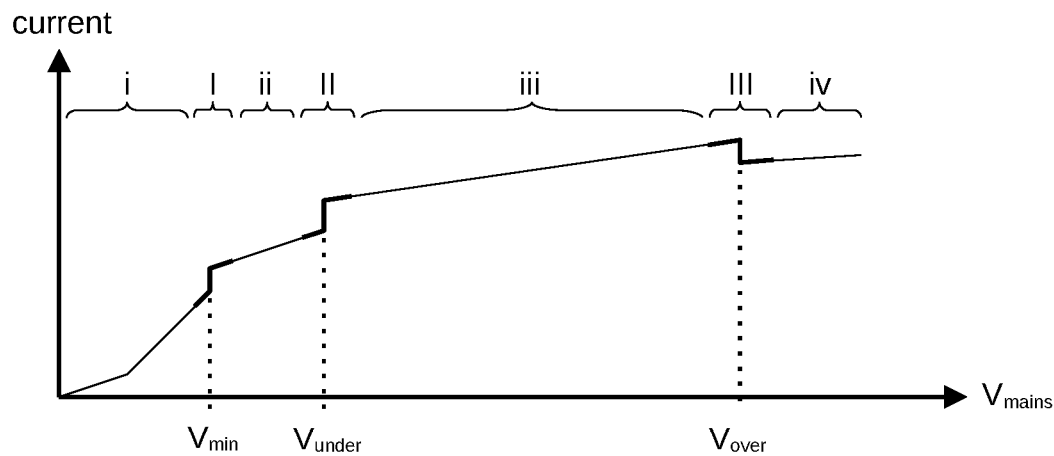
FIGS. 2A-D show a generalized graph of the supply current drawn by an electronic protection system as a function of the mains voltage.

FIG. 2A shows a generalized graph 200 of the supply current drawn by an electronic protection system as a function of the mains voltage. Its normal operating range is between $V_{under}$ and $V_{over}$, where the electronic protection system must maintain a connection between the mains voltage rails and the load it protects. Outside of this range, no connection is allowed. To operate reliably, an electronic protection system needs sufficient supply voltage, associated with a threshold $V_{min}$, as well as sufficient supply current. In some implementations, $V_{under}$ may not have been explicitly defined and $V_{min}$ effectively double-functions as $V_{under}$. Other implementations may not explicitly define $V_{over}$, and operation focuses on $V_{min}$ and $V_{under}$.

Electronic protection systems incorporate hysteresis in $V_{under}$ and $V_{over}$ to protect from transition instabilities. Once the main voltage crosses $V_{under}$ or $V_{over}$, hysteresis will change those threshold voltages to ensure a decisive crossing that is protected from noise below a certain margin, whose size is determined by the size of the hysteresis.

To be safe against noise and transition instabilities, the allowed range (the range is between $V_{under}$ and $V_{over}$) must be widened when the mains voltage is inside it, and narrowed when the mains voltage is outside it.

Nonlinearity in the current use at $V_{under}$ and $V_{over}$ can reduce or inverse the width of the built-in hysteresis, and cause instability. There is concern around three critical voltages: $V_{min}$ (area I), $V_{under}$ (area II), and $V_{over}$ (area III). In each of those areas, the internal mode of the electronic protection system is different, and different circuits may be active. Thus, the current as a function of the mains voltage changes in non-linear ways around the three thresholds. Since an electronic protection system has a small power budget, a relatively large change in current can result in a change of internal voltage levels, including reference voltages used for determining the threshold levels $V_{under}$ and $V_{over}$. This potentially creates a positive feedback loop, and instability.

Discontinuities outside of the areas I, II and III don't have this problem, and are of no concern for stability. Areas i (no operation), ii (undervoltage protection), iii (normal operation), and iv (overvoltage protection) may have any shape, including discontinuities and non-linearities, without adding to this problem. Also, unlike drawn in FIG. 2A, the current in areas i, ii, iii, and iv could be higher or lower than shown, the relative sizes could be different (for example, the current in area iii could be lower than in areas ii and iv), and the shape can be different than the straight line segments shown in the areas i through iv.

During power-up and power-down, the mains voltage crosses through $V_{min}$ (area I), where the electronic protection system has insufficient voltage and/or current to operate. In this area I, it is also important to realize that a fast ramp up of the mains voltage can cause a different situation than a slow ramp up. This is because the electronic protection system has internal stabilization of its own operating power. Thus, the mains voltage sensed for normal operation may reach its terminals before the electronic protection system has fully powered up. On the other hand, the electronic protection system is likely to power down only after it has sensed that the mains voltage has suddenly been removed.

Figures 2B, 2C, 2D:
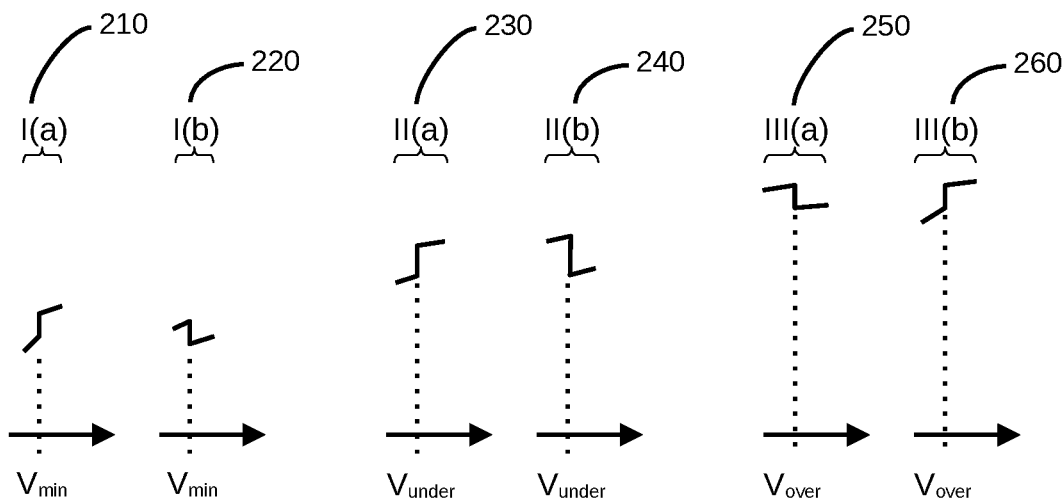

FIG. 2B shows that at $V_{min}$, the current could step up 210 (detail I(a)) or step down 220 (detail I(b)). If the current steps down, or is continuous, then there is a negative feedback loop, and the circuit is stable. If the current steps up, then there is a positive feedback loop, and the circuit is unstable. Thus, detail I(a) has an inherent instability, and step up 210 must be prevented. An implementation must ensure that at $V_{min}$ the electronic protection system has sufficient current. If not, the impact of nonlinearities is much increased, resulting in greater instability.

FIG. 2C shows that at $V_{under}$, the current may increase 230 or decrease 240, depending on the exact internal functions of an electronic protection system implementation. An increase (detail II(a)) is inherently unstable if it increases $V_{under}$, and inherently stable if it decreases $V_{under}$. A decrease (detail II(b)) is inherently unstable if it decreases $V_{under}$ and inherently stable if it increases $V_{under}$.

An implementation that has no explicit undervoltage protection may have or lack the capability to protect against both variations of the mains voltage (noise) and positive feedback loops due to current nonlinearities. If it lacks the capability, then undervoltage protection must be built in to guarantee stability.

FIG. 2D shows that at $V_{over}$ the current may decrease 250 (detail III(a)) or increase 260 (detail III(b)). At the start of overvoltage protection, the allowed range must be narrowed, or more specifically, $V_{over}$ must become lower. If decrease 250 (detail III(a)) lowers the threshold voltage $V_{over}$, then the circuit is inherently stable, and if it raises the threshold voltage, the circuit is potentially unstable. Similarly, if increase 260 (detail III(b)) lowers the threshold voltage $V_{over}$, then the circuit may become instable, and if it raises $V_{over}$, then it is inherently stable.

Figure 3:
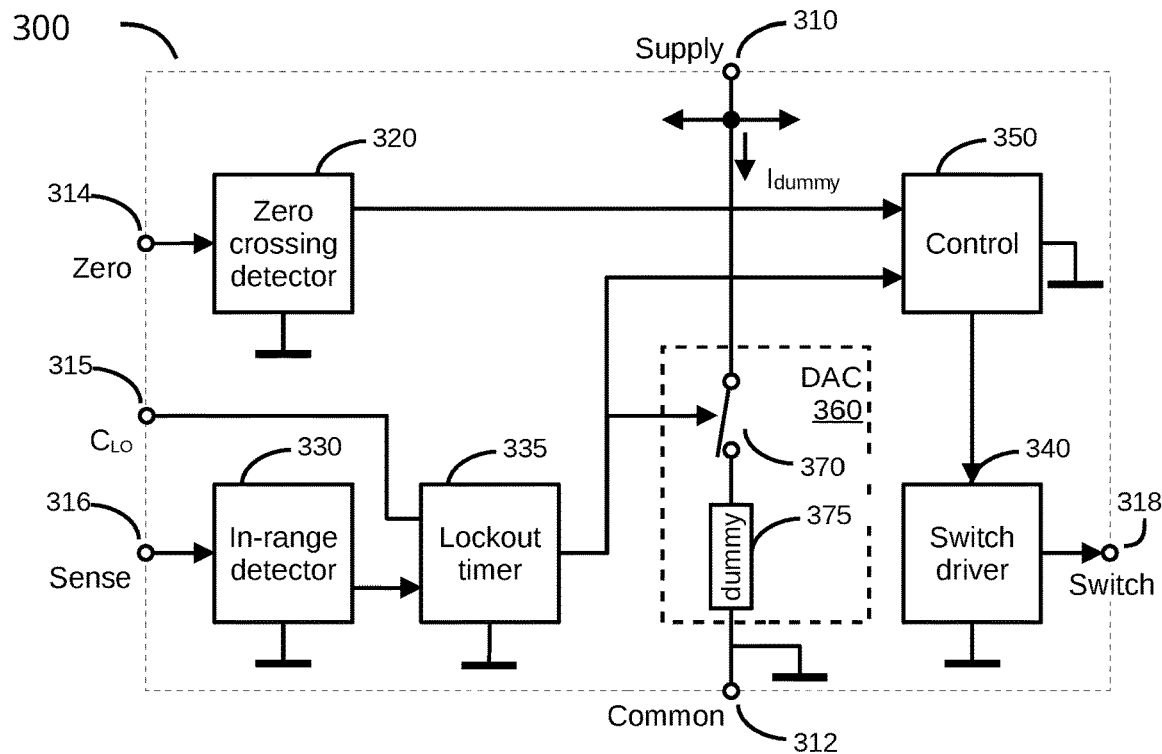
FIG. 3 illustrates a first example electronic protection circuit in an implementation of the disclosed technology.
Figure 6:
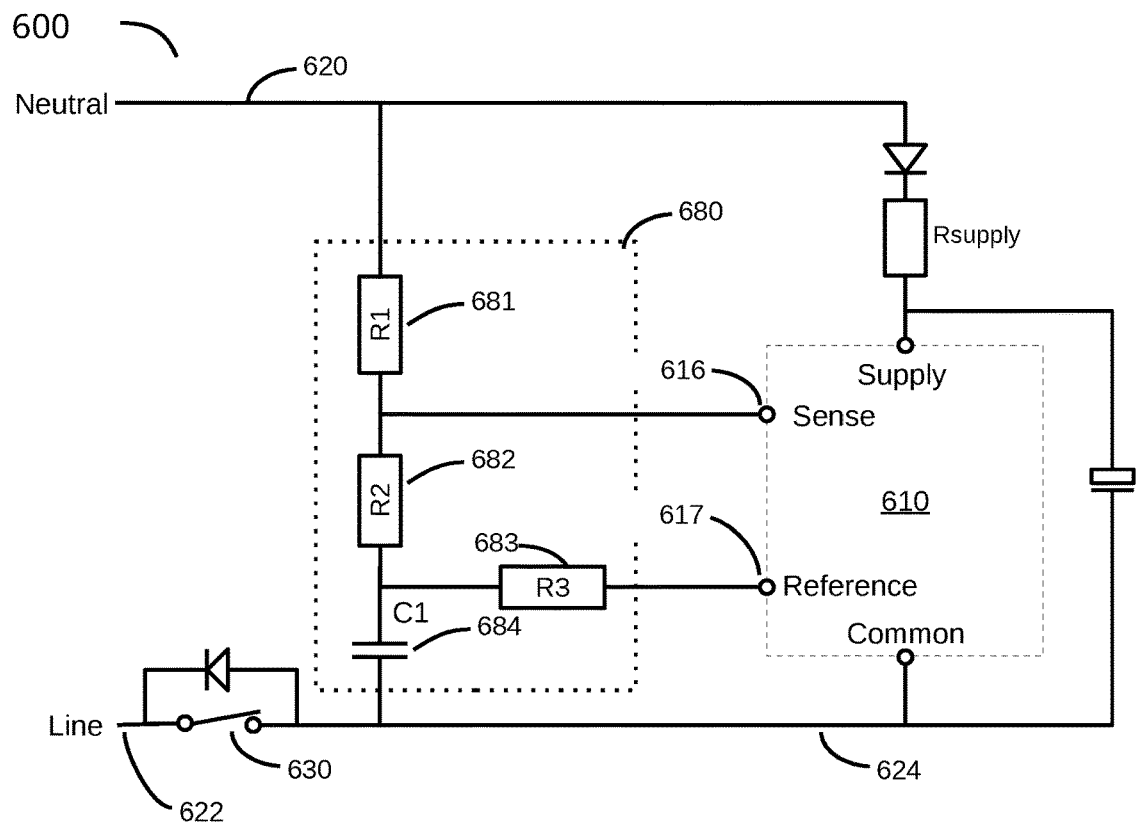
FIG. 6 illustrates details of a filter that provides power supply stability in an implementation of the disclosed technology.

Implementations may switch one or more dummy currents on or off around the three threshold voltages $V_{min}$, $V_{under}$, and $V_{over}$. Circuits to do so are shown in FIGS. 3-3. They may further reduce currents flowing out of the pins of an electronic protection system IC by use of external filtering, as illustrated in FIG. 6.

FIG. 3 illustrates a first example electronic protection circuit 300 in an implementation of the disclosed technology. Electronic protection circuit 300 may be an IC, and includes supply terminal 310, common terminal 312, at least one zero crossing detector terminal 314, a sense terminal 316, and a switch terminal 318 to couple electronic protection circuit 300 to external devices to make up an electronic protection system. Electronic protection circuit 300 further includes zero crossing detector 320, in-range detector 330, switch driver 340, control unit 350, and one-bit dummy DAC 360, with DAC switch 370 and dummy resistor 375. An implementation may also include lockout timer 335 coupled between in-range detector 330 on one side and control unit 350 and dummy DAC 360 on the other side. In some implementations, dummy DAC 360 may have a higher resolution than one bit and includes additional switched dummy resistors. In further implementations, dummy DAC 360 includes one or more switched current sources instead of one or more switched dummy resistors. Supply terminal 310 receives a power supply current, at least a part of which it returns via common terminal 312, and any remaining parts may flow out of electronic protection circuit 300 as one or more operational currents via any of the other terminals. In some implementations, or some of the time, an operational current may have a negative sign, i.e., flow into electronic protection circuit 300 and flow out of it via common terminal 312. Supply terminal 310 uses the power supply current to generate any required internal voltage and current sources and voltage and current references, and generally distributes the power supply current among the circuits inside electronic protection circuit 300, including zero crossing detector 320, in-range detector 330, switch driver 340, control unit 350, and dummy DAC 360.

Zero crossing detector 320 senses, via its at least one zero crossing detector terminal 314 when an external current reverses direction, i.e., crosses zero. An implementation may, for example, monitor an external raw supply voltage of 230V AC, with a mains frequency of 50 Hz. The external raw supply voltage could have a sinusoidal form, and a mains current delivered could cross through zero and reverse direction at the top and at the bottom of the voltage sinus. To accomplish this, an implementation of zero crossing detector terminal 314 may include a differentiator whose input receives (a fixed portion of) the external raw supply voltage and detect the timing of the top and the bottom of the sinus when the output of the differentiator goes from negative to positive, or vice versa, i.e., goes through zero. Zero crossing detector terminal 314 provides the zero crossing time information to control unit 350, which may include timing circuitry, combinatorial logic, a state machine, a lookup table, a hardwired processor, and/or a programmable processor.

In another implementation, zero crossing detector 320 may have two zero inputs, as depicted in FIG. 1, and a current zero crossing is detected by measuring a voltage over, for example, the external power switch. If the external power switch is a solid-state device, it will have an on-resistance of perhaps a few tens to a few hundreds of milliohms, and any current through it will create a voltage difference whose polarity is easily measured.

In-range detector 330 senses, via sense terminal 316, whether an external raw supply voltage is inside or outside an allowed range, or whether an absolute value of the external raw supply voltage is inside or outside the allowed range. The allowed range may be widened or narrowed, i.e., the allowed range may have a hysteresis. The allowed range may become narrowed once the implementation determines that the external raw supply voltage is outside the allowed range, and it may be widened once the implementation determines that the external raw supply voltage is inside the allowed range. Widening and narrowing the allowed range provides stability around the time of switching, when naturally occurring noise might otherwise cause an instable transition from one state to another state. An implementation may determine that the external raw supply voltage is outside the allowed range by comparing a peak level of the external raw supply voltage, or an absolute peak level of the external raw supply voltage, with an overvoltage threshold and an undervoltage threshold. When it becomes higher than the overvoltage threshold or lower than the undervoltage threshold then it is outside of the allowed range, and the implementation may narrow the allowed range by lowering the overvoltage threshold and/or raising the undervoltage threshold, respectively. Conversely, when it becomes lower than the overvoltage threshold or higher than the undervoltage threshold, it is inside the allowed range, and the implementation may widen the allowed range by raising the overvoltage threshold and/or lowering the undervoltage threshold. In-range detector 330 forwards a signal to control unit 350 including the result of the in-range detection and the timing of any changes in the detection result. In the implementation of electronic protection circuit 300, it also uses the result and its timing to switch DAC switch 370. In one implementation, it allows current to run through dummy DAC 360 whenever the external raw supply voltage is within the allowed range, and stops current from running through dummy DAC 360 when the external raw supply voltage is outside of the allowed range. In another implementation, it allows current to run through dummy DAC 360 whenever the external raw supply voltage is outside the allowed range, and stops current from running through dummy DAC 360 when the external raw supply voltage is inside the allowed range. In some implementations, the size of the dummy resistor is programmable. Thus, the current running through dummy DAC 360 can compensate for changes in supply current running through supply terminal 310 between the two modes: in-range, and out-of-range.

Some implementations include lockout timer 335. Lockout timer 335 has a lockout duration that may be programmable, for example through a register setting, or configurable, for example by the capacitance of a lockout time capacitor externally connected to a lockout capacitor terminal 315, or by other means, such as a resistor value, an IC bond option, a voltage applied to an external terminal of the IC, the content of a non-volatile memory or one-time-programmable memory, an IC mask option, and any other method known in the art. If the lockout duration is configured by a lockout capacitor value, lockout timer 335 may time out after one or more cycles of charging the lockout capacitor. Lockout timer 335 ensures that an out-of-range signal from the in-range detector is always passed on for at least the lockout duration. This allows an external load some thermal recovery time after the electronic protection circuit has disconnected the load from the mains supply lines following detection of a dangerous condition. If lockout timer 335 receives an out-of-range signal from in-range detector 330, then in some implementations lockout timer 335 ensures that its output signal copies the out-of-range signal for at least the lockout duration, and in other implementations lockout timer 335 ensures that its out-of-range output signal continues past the end of its out-of-range input signal for at least the lockout duration. At other times, lockout timer 335 copies its in-range input signal to the output.

Switch driver 340 includes a buffer to drive at least one power switch, such as an IGBT, bipolar transistor, MOSFET, super-junction MOSFET, DMOS transistor, thyristor, etc., where the power switch or switches couple the external raw supply voltage to or with a load to be protected. Switch driver 340 may further include timing circuitry, for example to operate the power switch or switches with one or more delays, that may be programmable.

Control unit 350 controls switch driver 340, based on the information it receives from zero crossing detector 320 and in-range detector 330. In particular, its function includes determining from in-range detector 330 when the external raw supply voltage goes out of range, then waiting for a signal from zero crossing detector 320 that a zero crossing occurs, and then instructing switch driver 340 to turn off the power switches.

Figure 4:
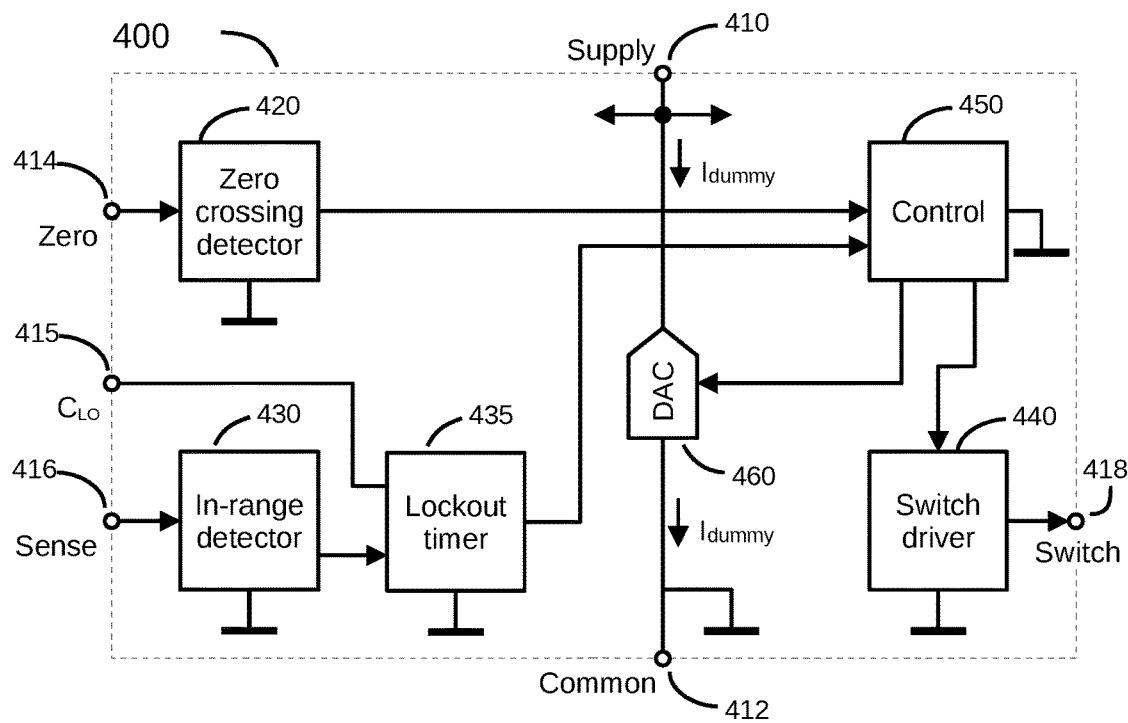
FIG. 4 illustrates a second example electronic protection circuit in an implementation of the disclosed technology.

FIG. 4 illustrates a second example electronic protection circuit 400 in an implementation of the disclosed technology. Electronic protection circuit 400 includes all elements of electronic protection circuit 300, drawn with likewise reference numbers. However, in this implementation, control unit 450 instead of in-range detector 430 controls dummy DAC 460. The timing is such that control unit 450 changes dummy DAC 460 no earlier than that it receives a change from in-range detector 430, and no later than that it processes a change from zero crossing detector 420. In this manner, the operation of electronic protection circuit 300 and electronic protection circuit 400 is substantially the same, but with the added possibility to control the timing and size of the current through dummy DAC 460. Dummy DAC 460 may be implemented with one or more switched dummy resistors, as in FIG. 3, or with switched current sources, or as any other DAC with current output known in the art.

Figure 5:
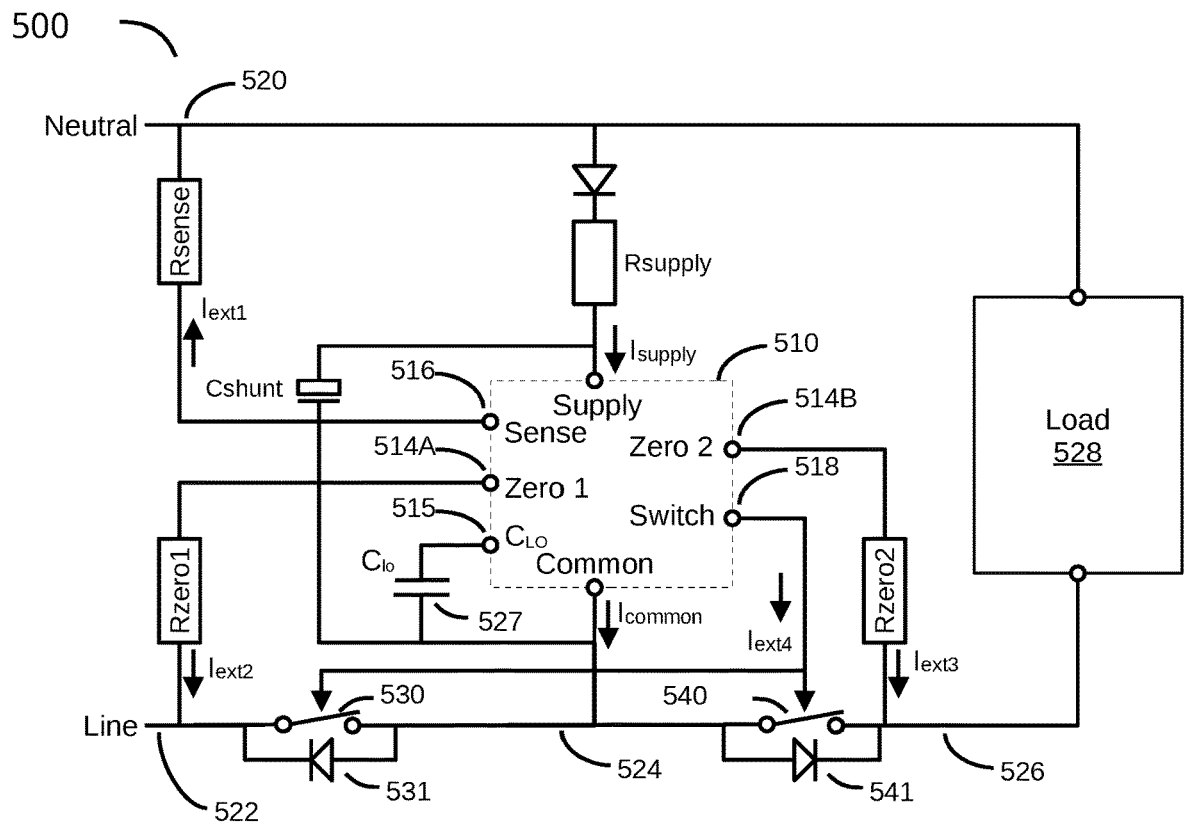
FIG. 5 illustrates an example electronic protection system in an implementation of the disclosed technology, including an electronic protection circuit as shown in FIG. 3 or as shown in FIG. 4.

FIGS. 3-4 depict implementations that with present technology may easily be integrated within a monolithic semiconductor. FIG. 5 illustrates an example electronic protection system 500 in an implementation of the disclosed technology, including an electronic protection circuit 510 as shown in FIG. 3 or as shown in FIG. 4. In this case, electronic protection circuit 510 features two inputs to detect a zero crossing, i.e., zero-crossing terminal 514A and zero-crossing terminal 514B. Electronic protection system 500 operates on neutral rail 520 and line rail 522, between which the external raw supply voltage is applied. In this implementation, neutral rail 520 is directly coupled with load 528, whereas line rail 522 is coupled with load 528 via external switch 530 and external switch 540. Electronic protection circuit 510 has a common terminal coupled with common node 524, which is coupled between external switch 530 and external switch 540. The diode 531 ensures that the circuit can power up. The diode 541 allows for a continued common conduction path back to neutral rail 520 when line rail 522 is positive and both external switch 530 and external switch 540 are off. Electronic protection circuit 510 receives its supply current via, for example, a resistor Rsupply. Its supply terminal may be shunted to common node 524 with a decoupling capacitor Cshunt (for example, as drawn). The implementation senses overvoltage and undervoltage conditions via sense terminal 516 which is coupled to neutral rail 520 via, for example, a large resistor Rsense. The implementation senses zero crossings by sensing if there is a zero-voltage differential between line rail 522 and load node 526. Sensing is done via two large resistors Rzero1 and Rzero2, one of which each protects zero-crossing terminal 514A and zero-crossing terminal 514B. If an implementation of electronic protection circuit 510 includes a lockout timer, it may have a lockout capacitor terminal 515 to connect to an external lockout capacitor 527 that configures the lockout duration.

In the example electronic protection system 500, it is possible that neutral rail 520 is within an allowed range, when electronic protection circuit 510 is still in the process of powering up. It takes time to charge Cshunt through Rsupply to a supply voltage that is sufficient for electronic protection circuit 510 to fully operate, whereas the voltage at neutral rail 520 is sensed imminently via Rsense. External switch 530 and external switch 540 are off (in a properly functional implementation) when electronic protection circuit 510 has insufficient supply. When a sufficient supply voltage is reached, the implementation switches on these switches, because the in-range detector senses that the external raw supply voltage is within the allowed range.

It is also possible that the external raw supply voltage starts slow compared to the time to charge Cshunt through Rsupply, or that the external raw supply voltage is otherwise not in range. Both external switch 530 and external switch 540 are disconnected. The allowed range is narrowed. Upon reaching the undervoltage threshold, the allowed range widens and external switch 530 and external switch 540 couple line rail 522 to load node 526, so that the external raw supply voltage is applied to load 528. The implementation maintains this status until the external raw supply voltage drops below or increases above the widened allowed range.

FIG. 5 depicts one of several architectures in which electronic protection circuit 510 may be used to create an electronic protection system. Other implementations might couple the electronic protection circuit 510 common terminal with the neutral rail 520 instead of line rail 522; they may use switches to decouple both sides of the load (in this case, load 528) from the mains supply rails; and they may use a circuit different than a diode, Rsupply, and Cshunt to feed electronic protection circuit 510. All those variations are within the scope of the present disclosed technology. For practical purposes, the example implementation in FIG. 5 may be one of the lowest cost implementations. It is also a reason why the circuit in FIG. 6 may sometimes be needed to further reduce and/or eliminate positive feedback problems.

FIG. 6 illustrates details 600 of a filter 680 that provides further power supply stability in an implementation of the disclosed technology. The implementation uses filter 680 to reduce currents through the pins of electronic protection IC 610, thereby reducing the size of nonlinearities in its supply current as a function of the external raw voltage, and thus reducing positive feedback that result from the nonlinearities. As long as the total effect of any positive feedback is small relative to the size of the hysteresis in the allowed range, the transitions occurring at the threshold voltages can be stable and decisive. An electronic protection circuit generally needs to sense both positive and negative signals. To do so easily would require the IC to have both a positive and a negative supply voltage, referenced to a common node. However, a lower cost alternative is to use an IC with a single power supply, for instance using a positive supply terminal and a common terminal. A reference voltage terminal, which outputs a reference voltage higher than the common terminal potential and lower than the supply terminal potential, may then be used as a reference for sensing both positive and negative overvoltage and undervoltage conditions. The reference voltage terminal, during the operation of sensing whether the raw supply voltage is within range, alternately sources and sinks sense currents, dependent on the instantaneous voltage of the raw supply voltage. The size of the sense currents may be significant compared to the amount of supply current taken by the whole IC, which jeopardizes its operational stability. FIG. 6 includes electronic protection IC 610 with sense terminal 616 and reference voltage terminal 617. The electronic protection IC 610 draws its supply current from neutral rail 620, via a rectifier diode and resistor Rsupply, or via any other means to provide a supply voltage lower than the positive maximum voltage on neutral rail 620, and returns the supply current to line rail 622 via external switch 630 (or the parallel rectifier diode) and common node 624. As mentioned, even though sense terminal 616 can have a high impedance and may not impact the supply current, reference voltage terminal 617 can have a low impedance and may source and sink current. Filter 680 divides down the voltage between neutral rail 620 and reference voltage terminal 617 via the divider R 681 and R 682. The divided voltage at sense terminal 616 roughly equals:

$$V_{616} = \frac{R_2 * (V_{620} - V_{ref})}{R_1 + R_2} \quad (1)$$

Without resistor 683 and capacitor 684, electronic protection IC 610 would source or sink a current from or into reference voltage terminal 617 equal to the voltage over $R_1+R_2$ divided by $R_1+R_2$. As mentioned, this may be unacceptable, and resistor 683 with capacitor 684 provides protection by drawing most of that current, at the mains frequency, from common node 624. For example, if the impedance of capacitor 684 at the mains frequency equals 10% of the resistance of resistor 683, then the amount of current sourced or sinked by reference voltage terminal 617 is reduced by 90%.

Figure 7:
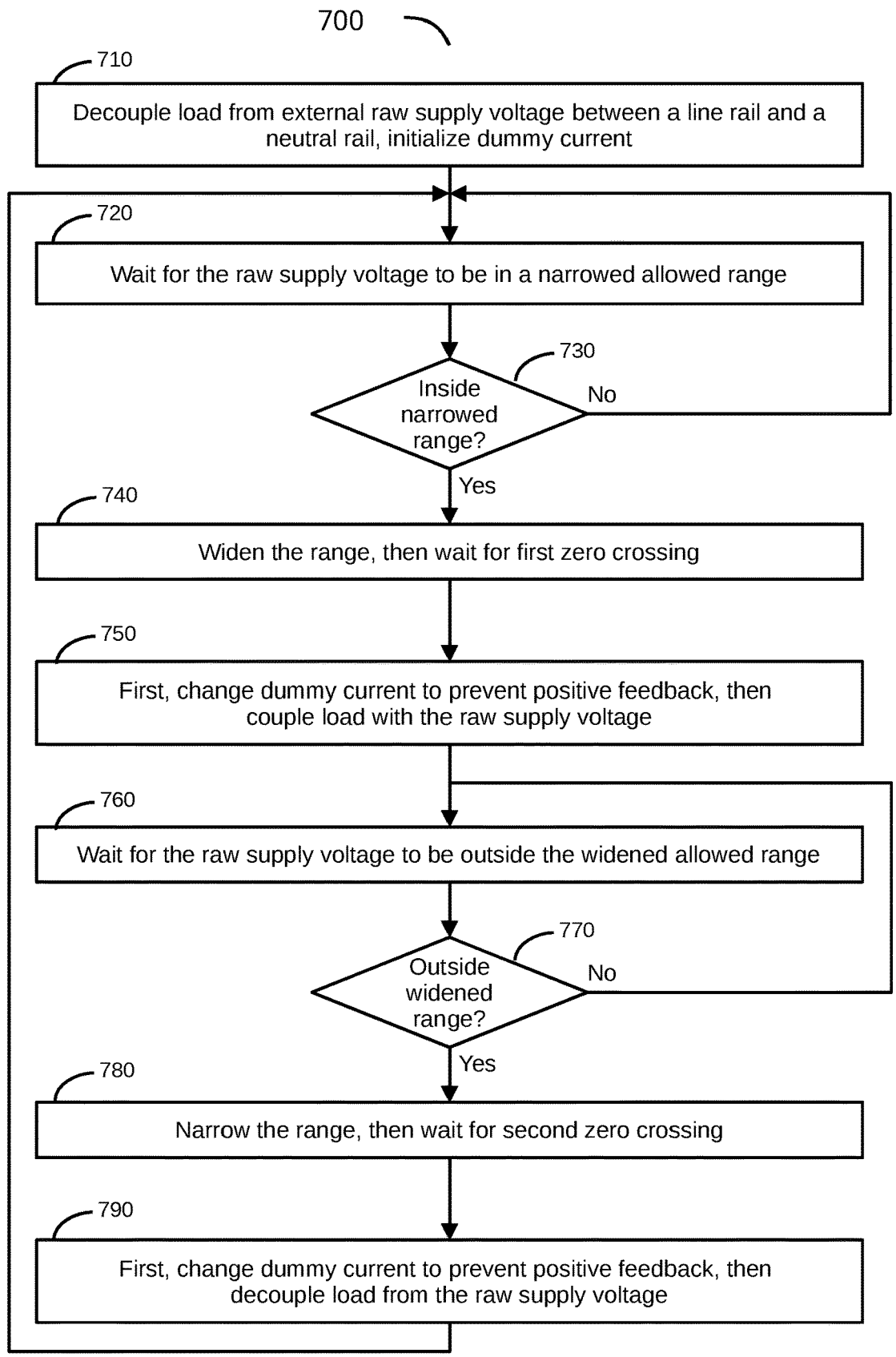
FIG. 7 illustrates a method for protecting against overvoltage and undervoltage conditions in an implementation of the disclosed technology.

FIG. 7 illustrates a method 700 for protecting against overvoltage and undervoltage conditions in an implementation of the disclosed technology. Method 700 includes the following steps, which may be performed in a continuous loop following its first step.

Step 710—using an electronic protection system, decoupling an external load from an external raw supply voltage between a line rail and a neutral rail, and initializing a dummy current in a protection IC. The protection IC provides a first switch signal to a switch to decouple the load from the raw supply voltage The external raw supply voltage may be, for instance, from an external mains supply. The external load may be, or include, a rectifier bridge or any other device, circuit, or system that needs to be protected from overvoltage and/or undervoltage. The implementation initializes the dummy current at a first value based on whether the electronic protection system receives sufficient supply voltage and sufficient supply current to fully operate, and based on whether a peak value of the raw supply voltage falls in a narrowed allowed range. The allowed range is defined as the range between the overvoltage threshold and the undervoltage threshold. Some implementations monitor one polarity of the raw supply voltage, whereas other implementations monitor both polarities, or an absolute value of the raw supply voltage.

Step 720—determining if the peak value of the raw supply voltage is in the narrowed allowed range. An implementation provides a raw supply voltage sense signal to the protection IC, which determines if the peak value of the raw supply voltage is in a narrowed allowed range by comparing the raw supply voltage sense signal with first window threshold values.

Step 730—upon determining that the peak value of the raw supply voltage is not in the narrowed allowed range, returning to Step 720.

Step 740—upon determining that the peak value of the raw supply voltage is in the narrowed allowed range, widening the allowed range and then waiting for a first zero crossing. To widen the allowed range, an implementation may raise an overvoltage threshold and/or lower an undervoltage threshold to second window threshold values. The first zero crossing may be defined as a moment when the raw supply voltage equals zero or as a moment when a voltage over the switch equals zero. The implementation may wait for the zero-voltage time to avoid high voltage transients when coupling the load to the raw supply voltage.

Step 750—changing the dummy current to a second value, and then coupling the load with the raw supply voltage. The second value of the dummy current is a value that prevents positive feedback that would result in significant narrowing of the widened allowed range during the coupling of the load with the raw supply voltage. The protection IC provides a second switch signal to the switch to couple the load with the raw supply voltage.

Step 760—determining if the peak value of the raw supply voltage is outside the widened allowed range. The protection IC compares the raw supply voltage sense signal with the second window threshold values.

Step 770—upon determining that the peak value of the raw supply voltage is not outside the widened allowed range, returning to Step 760.

Step 780—upon determining that the peak value of the raw supply voltage is outside the widened allowed range, narrowing the allowed range and then waiting for a second zero crossing. To narrow the allowed range, an implementation may lower the overvoltage threshold and/or raise the undervoltage threshold. The second zero crossing is defined as a moment when a current delivered by the raw supply voltage equals zero. In an alternating current (AC) environment, this is the moment that the current changes direction. The implementation waits for the zero-current time to avoid high voltage transients due to interrupting the load from the raw supply voltage, where the current may run through any inductive impedances associated with the electronic protection system or the load.

Step 790—first, changing the dummy current to a third value, and then decoupling the load from the raw supply voltage. The third value of the dummy current is a value that prevents positive feedback that would result in significant widening of the narrowed allowed range during the decoupling of the load from the raw supply voltage. Then, an implementation may return to Step 720.

CONSIDERATIONS

Although the description has been described with respect to particular implementations thereof, these particular implementations are merely illustrative, and not restrictive. For example, FIGS. 3-4 depict electronic protection circuits operating from a positive supply voltage with reference to a common terminal. However, all parts of the disclosed technology can be equally applied to electronic protection circuits operating from a negative supply voltage with reference to the common terminal. Further, the example given illustrate circuits that use the line rail as a ground reference, whereas other implementations may use the neutral rail as a ground reference. Examples provide the supply current for the electronic protection system via a resistor, whereas other implementations may use a switched power supply to power the fuse circuits. Some implementations may only provide overvoltage protection, whereas other implementations provide only undervoltage or both overvoltage and undervoltage protection. FIGS. 3-4 illustrate implementations in which power switches are external to an integrated circuit with the electronic protection system control. However, some implementations may include the power switches.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although the description has been described with respect to particular implementations thereof, these particular implementations are merely illustrative, and not restrictive. For instance, many of the operations can be implemented on a printed circuit board PCB using off-the-shelf devices, in a System-on-Chip (SoC), application-specific integrated circuit (ASIC), programmable processor, or in a programmable logic device such as a field-programmable gate array (FPGA), obviating a need for at least part of the dedicated hardware. All such variations and modifications are to be considered within the ambit of the present disclosed technology the nature of which is to be determined from the foregoing description.

Any suitable technology for manufacturing electronic devices can be used to implement the circuits of particular implementations, including CMOS, FinFET, BiCMOS, bipolar, JFET, MOS, NMOS, PMOS, HBT, MESFET, etc. Different semiconductor materials can be employed, such as silicon, germanium, SiGe, GaAs, InP, GaN, SiC, graphene, etc. Circuits may have single-ended or differential inputs, and single-ended or differential outputs. Terminals to circuits may function as inputs, outputs, both, or be in a high-impedance state, or they may function to receive supply power, a ground reference, a reference voltage, a reference current, or other. Although the physical processing of signals may be presented in a specific order, this order may be changed in different particular implementations. In some particular implementations, multiple elements, devices, or circuits shown as sequential in this specification can be operating in parallel.

Any suitable programming language can be used to implement the routines of particular implementations including C, C++, Java, JavaScript, compiled languages, interpreted languages and scripts, assembly language, machine language, etc. Different programming techniques can be employed such as procedural or object oriented. Methods embodied in routines can execute on a single processor device or on a multiple processor system. Although the steps, operations, or computations may be presented in a specific order, this order may be changed in different particular implementations. In some particular implementations, multiple steps shown as sequential in this specification can be performed at the same time.

Particular implementations may be implemented in a tangible, non-transitory computer-readable storage medium for use by or in connection with the instruction execution system, apparatus, board, or device. Particular implementations can be implemented in the form of control logic in software or hardware or a combination of both. The control logic, when executed by one or more processors, may be operable to perform that which is described in particular implementations. For example, a tangible non-transitory medium such as a hardware storage device can be used to store the control logic, which can include executable instructions.

Particular implementations may be implemented by using a programmed general-purpose digital computer, application-specific integrated circuits, programmable logic devices, field-programmable gate arrays, optical, chemical, biological, quantum or nanoengineered systems, etc. Other components and mechanisms may be used. In general, the functions of particular implementations can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

We claim:

1. An electronic protection circuit comprising:
a supply terminal operative to receive a supply current;
a common terminal operative to return at least a part of the supply current;
a sense terminal electrically coupled with a range detector, wherein the range detector is operative to determine whether a peak value of an external raw supply voltage is inside an allowed range, wherein the allowed range may be widened in a first state and narrowed in a second state, and wherein the range detector delivers a range-detection output signal that signals an in-range condition or an out-of-range condition dependent on the peak value of the external raw supply voltage being inside the allowed range;
one or more zero-crossing detection input terminals electrically coupled with a zero-crossing detector, wherein the zero-crossing detector is operative to determine a time of a first zero crossing and a time of a second zero crossing, wherein the time of the first zero crossing is a time of a zero crossing detected after the range-detection output signal has signaled an in-range condition and the time of the second zero crossing is a time of a zero crossing detected after the range-detection output signal has signaled an out-of-range condition;
a switch driver output terminal coupled with a switch driver output;
a control unit with a first input coupled with an output of the zero-crossing detector, a second input coupled with the output of the range detector, and an output coupled with an input of a switch driver, wherein the control unit is configured to change the switch driver to an on state starting from the time of the first zero crossing until the time of the second zero crossing; and
a dummy digital-to-analog converter (DAC) with current output operative to supply a dummy current that prevents instability resulting from positive feedback during a change from the first state to the second state and during a change from the second state to the first state, wherein the dummy current flows from the supply terminal through the dummy DAC to the common terminal.

2. The electronic protection circuit of claim 1, further comprising a lockout timer coupled between the output of the range detector and the control unit first input, wherein the lockout timer is operative to pass a range-detection output signal after the output of the range detector signals an out-of-range condition, and to pass a modified range-detection output signal after a lockout duration after the output of the range detector signals an in-range condition, wherein the lockout duration is configurable.

3. The electronic protection circuit of claim 2, wherein the lockout duration is configured by a value of a lockout capacitor, and the lockout timer times out after one or more cycles of charging the lockout capacitor.

4. The electronic protection circuit of claim 2, wherein:
the lockout timer times out after one or more cycles of a clock; and
the lockout duration is configured by at least one of:
an integrated circuit (ICI) bond option;
a voltage applied to an integrated circuit (ICI) pin;
a register value;
a content of a volatile memory;
a content of a non-volatile memory;
a content of a one-time-programmable memory; or
an integrated circuit (ICI) mask option.

5. The electronic protection circuit of claim 1, wherein the allowed range is narrowed when the external raw supply voltage is outside the allowed range, and widened when the external raw supply voltage is inside the allowed range.

6. The electronic protection circuit of claim 1, wherein the dummy DAC includes one or more switches and dummy resistors.

7. The electronic protection circuit of claim 1, wherein the dummy DAC includes one or more switched current sources.

8. The electronic protection circuit of claim 1, wherein one or more dummy DAC output levels are programmable.

9. The electronic protection circuit of claim 1, wherein the range-detection output signal controls the dummy DAC.

10. The electronic protection circuit of claim 1, wherein the control unit controls the dummy DAC.

11. A method for protecting a load from overvoltage or undervoltage conditions in a raw supply voltage between a line rail and a neutral rail, comprising:
(a) from a protection integrated circuit (IC), providing a first switch signal to a switch to decouple the load from the raw supply voltage, wherein the switch is coupled between the load and one of the line rail and the neutral rail;
(b) in the protection IC, initializing a dummy current to a first value;
(c) providing a raw supply voltage sense signal to the protection IC, and in the protection IC, determining if a peak value of the raw supply voltage is in a narrowed allowed range by comparing the raw supply voltage sense signal with first window threshold values;
(d) upon determining that the peak value of the raw supply voltage is not in the narrowed allowed range, returning to step (c);
(e) upon determining that the peak value of the raw supply voltage between the line rail and the neutral rail is in the narrowed allowed range, widening the narrowed allowed range to a widened allowed range, delimited by second window threshold values;
(f) waiting for a first zero crossing in a zero-crossing detector input signal of the protection IC;
(g) changing the dummy current to a second value;
(h) from the protection IC, providing a second switch signal to the switch to couple the load with the raw supply voltage;
(i) in the protection IC, determining if the peak value of the raw supply voltage is outside the widened allowed range by comparing the raw supply voltage sense signal with the second window threshold values;
(j) upon determining that the peak value of the raw supply voltage is not outside the widened allowed range, returning to step (i);
(k) upon determining that the peak value of the raw supply voltage is outside the widened allowed range, narrowing the widened allowed range to the narrowed allowed range;

(l) waiting for a second zero crossing;
(m) changing the dummy current to a third value; and
(n) providing the first switch signal to the switch to decouple the load from the raw supply voltage.

12. The method of claim 11, further comprising:
upon determining that the peak value of the raw supply voltage is outside the widened allowed range, waiting for at least a lockout duration before allowing the load to be coupled to the raw supply voltage, wherein the lockout duration is configurable.

* * * * *